United States Patent
Tourapis et al.

(10) Patent No.: US 10,999,583 B2
(45) Date of Patent: May 4, 2021

(54) SCALABILITY OF MULTI-DIRECTIONAL VIDEO STREAMING

(71) Applicant: Apple Inc., Cupertino, CA (US)

(72) Inventors: Alexandros Tourapis, Milpitas, CA (US); Dazhong Zhang, Milpitas, CA (US); Hang Yuan, San Jose, CA (US); Hsi-Jung Wu, Cupertino, CA (US); Jae Hoon Kim, San Jose, CA (US); Jiefu Zhai, San Jose, CA (US); Ming Chen, Cupertino, CA (US); Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/132,219

(22) Filed: Sep. 14, 2018

(65) Prior Publication Data

US 2020/0092571 A1 Mar. 19, 2020

(51) Int. Cl.
*H04N 19/29* (2014.01)
*H04N 19/103* (2014.01)
(Continued)

(52) U.S. Cl.
CPC .............. *H04N 19/29* (2014.11); *G09G 5/14* (2013.01); *H04N 19/103* (2014.11); *H04N 21/44004* (2013.01)

(58) Field of Classification Search
CPC ..... H04L 65/80; H04L 65/4084; H04L 65/60; H04L 29/06027; H04N 21/8456;
(Continued)

(56) References Cited

U.S. PATENT DOCUMENTS

2015/0249813 A1* 9/2015 Cole ................ H04L 65/607
386/241
2016/0352791 A1 12/2016 Adams et al.
(Continued)

FOREIGN PATENT DOCUMENTS

WO    2017011054 A1   1/2017
WO    WO 2017/060423 A1   4/2017
(Continued)

OTHER PUBLICATIONS

El-Ganainy et al.; "Streaming Virtual Reality Content"; Cornell University; 2016; 8 pages.
Gaddam et al.; "Tiling in Interactive Panoramic Video: Approaches and Evaluation"; IEEE Transactions on Multimedia; vol. 18; Sep. 2016; p. 1819-1831.
(Continued)

*Primary Examiner* — Farhan Mahmud
(74) *Attorney, Agent, or Firm* — BakerHostetler

(57) ABSTRACT

Aspects of the present disclosure provide techniques for reducing latency and improving image quality of a viewport extracted from multi-directional video communications. According to such techniques, first streams of coded video data are received from a source. The first streams include coded data for each of a plurality of tiles representing a multi-directional video, where each tile corresponding to a predetermined spatial region of the multi-directional video, and at least one tile of the plurality of tiles in the first streams contains a current viewport location at a receiver. The techniques include decoding the first streams and displaying the tile containing the current viewport location. When the viewport location at the receiver changes to include a new tile of the plurality of tiles, retrieving and decoding first streams for the new tile, displaying the decoded content for the changed viewport location, and transmitting the changed viewport location to the source.

22 Claims, 10 Drawing Sheets

(51) Int. Cl.
*G09G 5/14* (2006.01)
*H04N 21/44* (2011.01)

(58) Field of Classification Search
CPC ......... H04N 21/23439; H04N 21/2662; H04N 21/2402; H04N 21/6125; H04N 21/6587; H04N 21/64322; H04N 21/44004; H04N 21/4621; H04N 21/4384
See application file for complete search history.

(56) References Cited

U.S. PATENT DOCUMENTS

2017/0339415 A1    11/2017  Wang et al.
2018/0103199 A1*    4/2018  Hendry .............. H04N 21/8543

FOREIGN PATENT DOCUMENTS

WO       2017205794 A1    11/2017
WO    WO 2018/049221 A1    3/2018

OTHER PUBLICATIONS

Gudumasu et al.; "Segment Scheduling Method for Reducing 360° Video Streaming Latency"; Proceeding of SPIE Application of Digital Image Processing XL; vol. 10396; 2017; 13 pages.
International Patent Application No. PCT/US2019/049678; Int'l Search Report and the Written Opinion; dated Nov. 18, 2019; 16 pages.
International Patent Application No. PCT/US2019/049678; Int'l Preliminary Report on Patentability; dated Aug. 5, 2020; 21 pages.

* cited by examiner

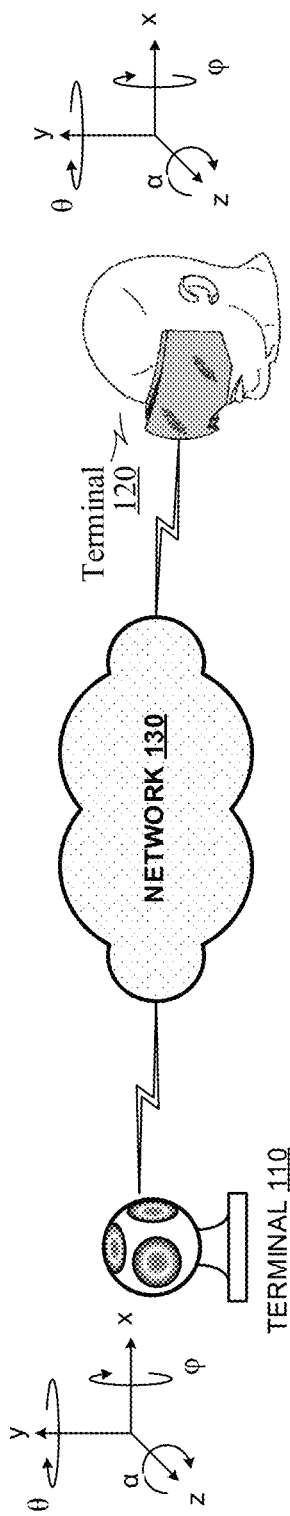
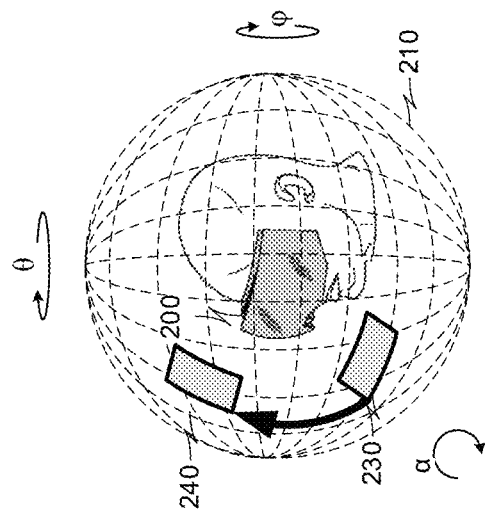

300

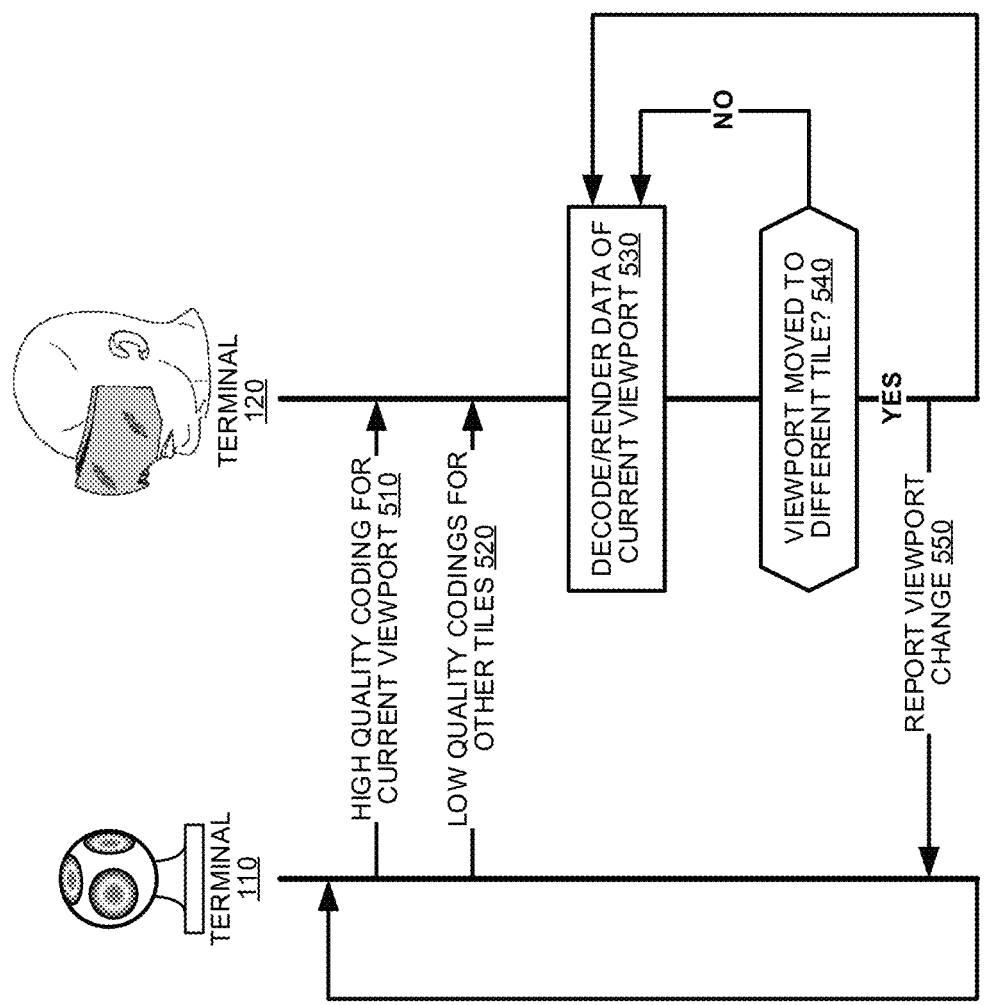

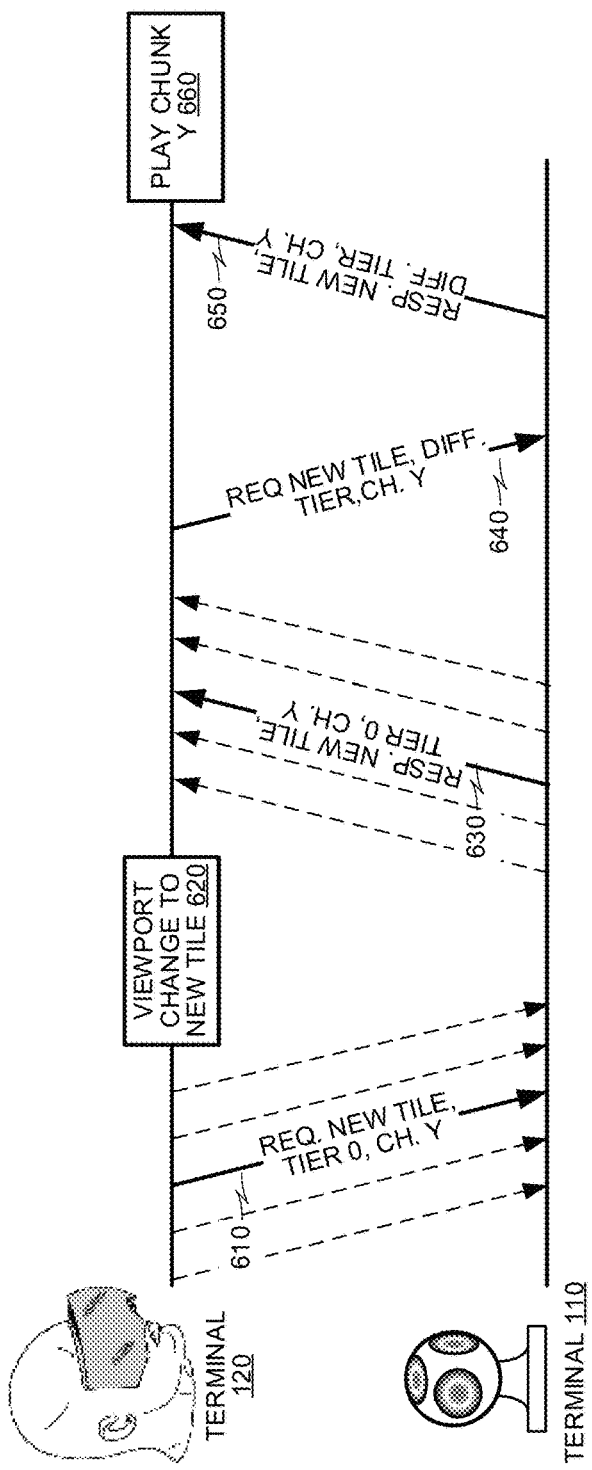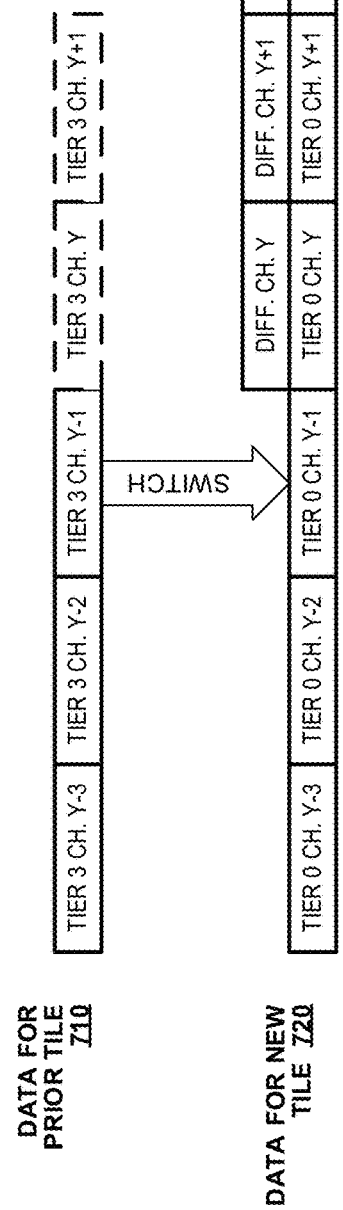

900

800

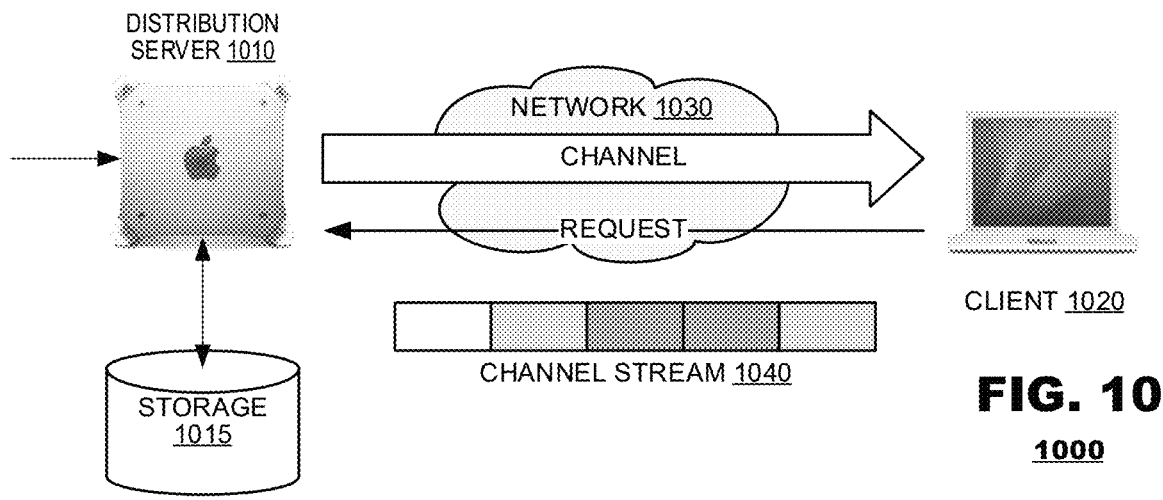
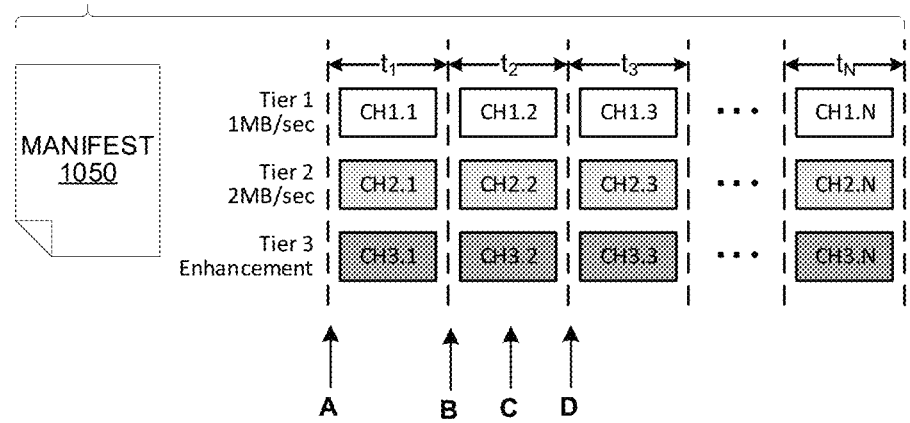
FIG. 10
1000
FIG. 11
1100
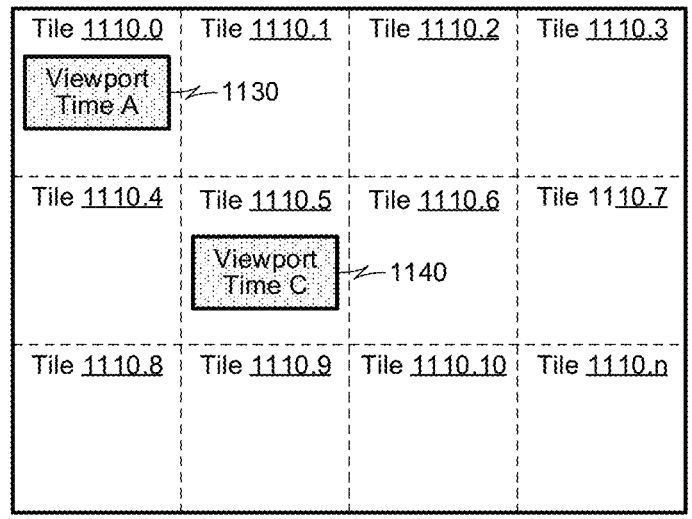

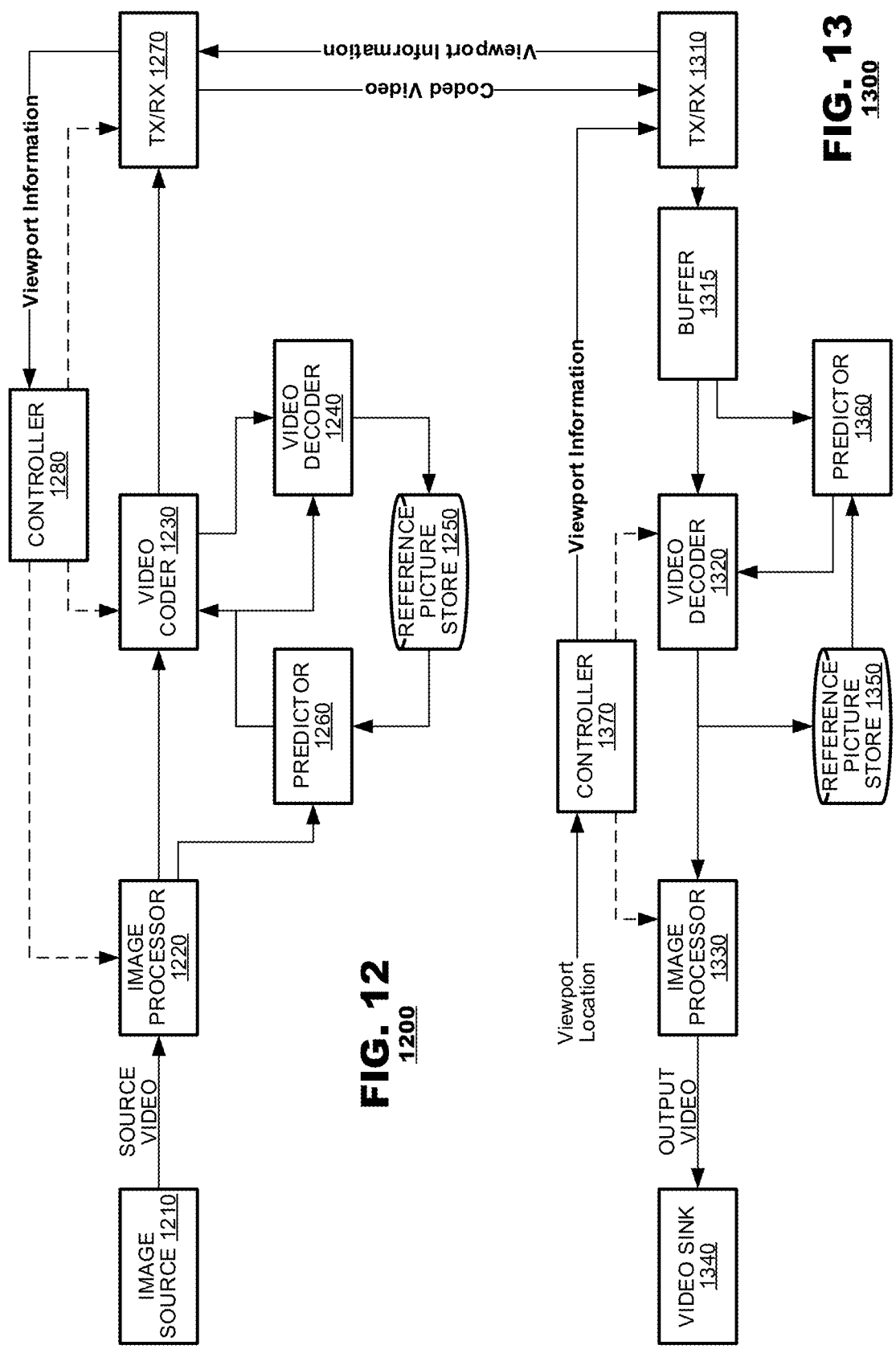

1400

1500

1600

1700

FIG. 18
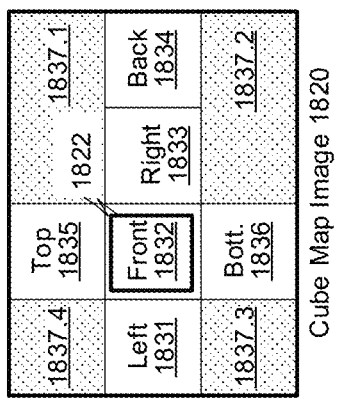
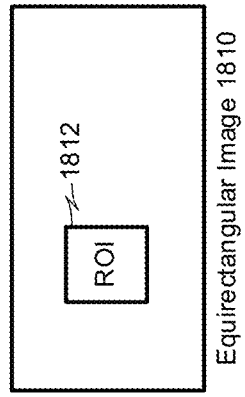
FIG. 19
1900
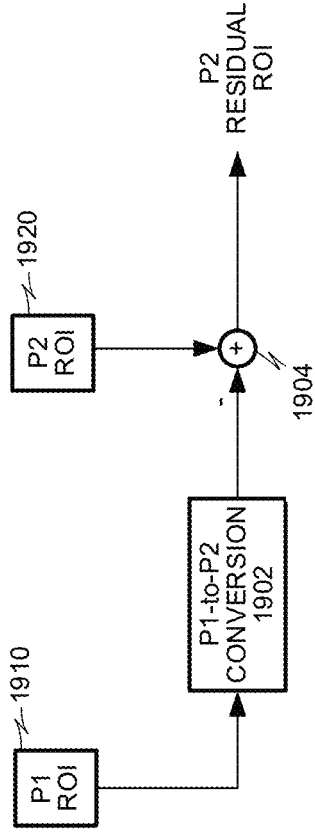

SCALABILITY OF MULTI-DIRECTIONAL VIDEO STREAMING

BACKGROUND

| Inventors: | Alexandros Tourapis | Jae Hoon Kim |
| --- | --- | --- |
| | Dazhong Zhang | Jiefu Zhai |
| | Hang Yuan | Ming Chen |
| | Hsi-Jung Wu | Xiaosong Zhou |

The present disclosure relates to coding techniques for multi-directional imaging applications.

Some modern imaging applications capture image data from multiple directions about a camera. Some cameras pivot during image capture, which allows a camera to capture image data across an angular sweep that expands the camera's effective field of view. Some other cameras have multiple imaging systems that capture image data in several different fields of view. In either case, an aggregate image may be created that merges image data captured from these multiple views.

A variety of rendering applications are available for multi-directional content. One rendering application involves extraction and display of a subset of the content contained in a multi-directional image. For example, a viewer may employ a head mounted display and change the orientation of the display to identify a portion of the multi-directional image in which the viewer is interested. Alternatively, a viewer may employ a stationary display and identify a portion of the multi-directional image in which the viewer is interested through user interface controls. In these rendering applications, a display device extracts a portion of image content from the multi-directional image (called a "viewport" for convenience) and displays it. The display device would not display other portions of the multi-directional image that are outside an area occupied by the viewport.

BRIEF DESCRIPTION OF THE DRAWINGS

FIG. 1 illustrates a system according to an aspect of the present disclosure.

FIG. 2 figuratively illustrates a rendering application for a sink terminal according to an aspect of the present disclosure.

FIG. 5 illustrates a method according to an aspect of the present disclosure.

FIG. 6. illustrates a method according to an aspect of the present disclosure.

FIG. 7. illustrates example data flows of FIG. 6.

FIG. 10 is a simplified block diagram of an example video distribution system.

FIG. 11 illustrates a frame 1100 of multi-directional video with a moving viewport.

FIG. 12 is a functional block diagram of a coding system according to an aspect of the present disclosure.

FIG. 13 is a functional block diagram of a decoding system according to an aspect of the present disclosure.

FIG. 18 illustrates two exemplary multi-directional projections for combining.

FIG. 19 illustrates an exemplary system for creating a residual from two different multi-directional projections.

DETAILED DESCRIPTION

Figure 3:
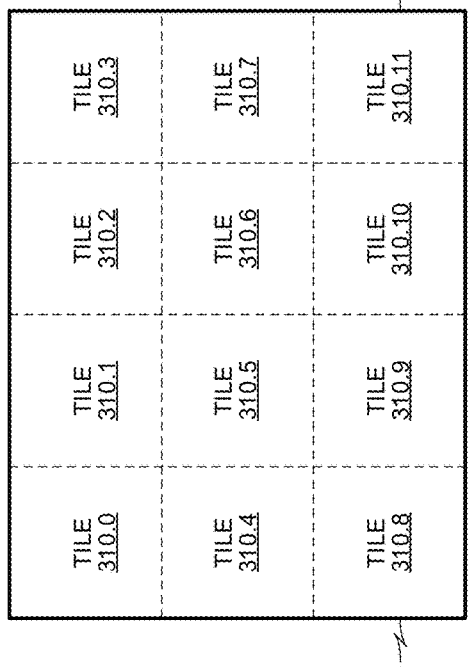
FIG. 3 illustrates an exemplary partitioning scheme in which a frame is partitioned into non-overlapping tiles.

In communication applications, aggregate source image data at a transmitter exceeds the data that is needed to display a rendering of a viewport at a receiver. Coding techniques for transmitting source data may account for a current viewport of the receiving rendering device. However, when accounting for a moving viewport, these coding techniques incur coding and transmission latency and coding inefficiency.

Aspects of the present disclosure provide techniques for reducing latency and improving image quality of a viewport extracted from multi-directional video communications. According to such techniques, first streams of coded video data are received from a source. The first streams include coded data for each of a plurality of tiles representing a multi-directional video, where each tile corresponding to a predetermined spatial region of the multi-directional video, and at least one tile of the plurality of tiles in the first streams contains a current viewport location at a receiver. The techniques include decoding the first streams corresponding to the at least one tile containing the current viewport location, and displaying the decoded content for the current viewport location. When the viewport location at the receiver changes to include a new tile of the plurality of tiles, retrieving first streams for the new tile, decoding the retrieved first streams, displaying the decoded content for the changed viewport location, and transmitting information representing the changed viewport location to the source.

FIG. 1 illustrates a system 100 according to an aspect of the present disclosure. There, the system 100 is shown as including a source terminal 110 and a sink terminal 120 interconnected by a network 130. The source terminal 110 may transmit a coded representation of omnidirectional video to the sink terminal 120. The sink terminal 120 may receive the coded video, decode it, and display a selected portion of the decoded video.

FIG. 1 illustrates the source terminal 110 as a multi-directional camera that captures image data of a local environment before coding it. In another aspect, the source terminal 110 may receive omni-directional video from an external source (not shown), such as a streaming service or storage device.

The sink terminal 120 may determine a viewport location in a three-dimensional space represented by the multi-directional image. The sink terminal 120 may select a portion of decoded video to be displayed, for example, based on the terminal's orientation in free space. FIG. 1 illustrates the sink terminal 120 as a head mounted display but, in other aspects, the sink terminal 120 may be another type of display device, such as a stationary flat panel display, smartphone, tablet computer, gaming device or portable media player.

Different types of user controls may be provided with each such display type through which a viewer identifies the viewport. The sink terminal's device type is immaterial to the present discussion unless otherwise noted herein.

The network 130 represents any number of computer and/or communication networks that extend from the source terminal 110 to the sink terminal 120. The network 130 may include one or a combination of circuit-switched and/or packet-switched communication networks. The network 130 may communicate data between the source terminal 110 and the sink terminal 120 by any number of wireline and/or wireless communication media. The architecture and operation of the network 130 is immaterial to the present discussion unless otherwise noted herein.

FIG. 1 illustrates a communication configuration in which coded video data is transmitted in a single direction from the source terminal 110 to the sink terminal 120. Aspects of the present disclosure find application with communication equipment that exchange coded video data in a bidirectional fashion, from terminal 110 to terminal 120 and also from terminal 120 to terminal 110. The principles of the present disclosure find application with both unidirectional and bidirectional exchange of video.

FIG. 2 figuratively illustrates a rendering application for a sink terminal 200 according to an aspect of the present disclosure. There, omnidirectional video is represented as if it exists along a spherical surface 210 provided about the sink terminal 200. Based on the orientation of the sink terminal 200, the terminal 200 may select a portion of the video (called, a "viewport" for convenience) and display the selected portion. As the orientation of the sink terminal 200 changes, the terminal 200 may select different portions from the video. For example, FIG. 2 illustrates the viewport changing from a first location 230 to a second location 240 along the surface 210.

Aspects of the present disclosure may apply video compression techniques according to any of a number of coding protocols. For example, the source terminal 110 (FIG. 1) may code video data according to an ITU-T/ISO MPEG coding protocol such as H.265 (HEVC), H.264 (AVC), and the upcoming H.266 (VVC) standard, an AOM coding protocol such as AV1, or a predecessor coding protocol. Typically, such protocols parse individual frames of video into spatial arrays of video, called "pixel blocks" herein, and may code the pixel blocks in a regular coding order such as a raster scan order.

In an aspect, individual frames of multi-directional content may be parsed into individual spatial regions, herein called "tiles", and coded as independent data streams. FIG. 3 illustrates an exemplary partitioning scheme in which a frame 300 is partitioned into non-overlapping tiles 310.0-310.11. In a case where the frame 300 represents omnidirectional content (e.g., it represents image content in a perfect 360° field of view, the image content will be continuous across opposing left and right edges 320, 322 of the frame 300).

In an aspect, the tiles described here may be a special case of the tiles used in some standards, such as HEVC. In this aspect, the tiles used herein may be "motion constrained tile sets," where all frames are segmented using the exact same tile partitioning, and each tile in every frame is only permitted to use prediction from co-located tiles in other frames. Filtering in the decoder loop may also be disallowed across tiles, providing decoding independency between tiles.

Figure 4:
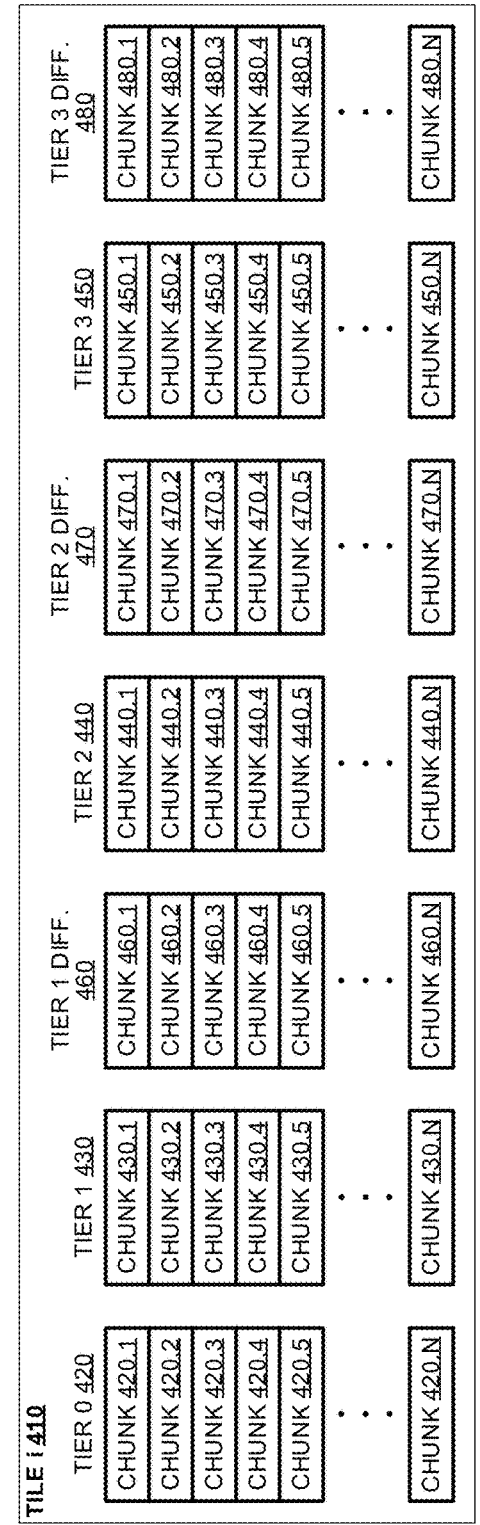
FIG. 4 illustrates a coded data stream that may be developed from coding of a single tile 410, according to an aspect of the present disclosure.

FIG. 4 illustrates a coded data stream that may be developed from coding of a single tile 410, according to an aspect of the present disclosure. The coded tile 410 may be coded in several representations 420-450, labeled "tier 0," "tier 1," "tier 2," and "tier 3" respectively, each corresponding to a predetermined bandwidth constraint. For example, a tier 0 coding may be generated for a 500 kbps representation, a tier 1 coding may be generated for a 2 Mbps representation, a tier 2 coding may be generated for a 4 Mbps representation, and a tier 3 coding may be generated for an 8 Mbps representation. In practice, the number of tiers and the selection of target bandwidth may be tuned to suit individual application needs.

The coded tile 410 also may contain a number of differential codings 460-480, each coded differentially with respect to the coded data of the tier 0 representation and each having a bandwidth tied to the bandwidth of another bandwidth tier. Thus, in an example where the tier 0 coding is generated at a 500 Kbps representation and the tier 1 coding is generated at a 2 Mbps representation, the tier 1 differential coding 460 may be coded at a 1.5 Mbps representation (1.5 Mbps=2 Mbps−500 Kbps). The other differential codings 470, 480 may have data rates that match the differences between the data rates of their base tiers 440, 450 and the data rate of the tier 0 coding 420. In an aspect, elements of the differential codings 460, 470, 480 may be coded predictively using content from a corresponding chunk of the tier 0 coding as a prediction reference; in such an embodiment, the differential codings 460, 470, 480 may be generated as enhancement layers according to a scalable coding protocol in which tier 0 serves as a base layer for those encodings.

The codings 420-480 of the tile are shown as partitioned into individual chunks (e.g., chunks 420.1-420.N for tier 0 420, chunks 430.1-430.N for tier 1 430, etc.). Each chunk may be referenced by its own network identifier. During operation, a client device 120 (FIG. 1) may select individual chunks for download and request the chunks from a source terminal 120 (FIG. 1).

FIG. 5 illustrates a method 500 according to an aspect of the present disclosure. According to the method 500, terminal 110 may transmit high quality coding for tiles included in a current viewport (msg. 510) and low quality coding for other tiles (msg. 520) from source terminal 110 to sink terminal 120. Sink terminal 120 may then decode and render data of the current viewport (box 530). If the viewport does not move to include different tiles (box 540), terminal 120 repeats decoding and rendering the current tiles (back to box 530). Alternately, if the viewport moves such that the tiles included in the viewport change, then the change in the viewport is reported back to the source terminal 110 (msg. 550). The source terminal 110 then repeats by sending high quality coding for the tiles of the new viewport location (back to msg. 510), and low quality tiles that do not include the new viewport location (msg. 520).

The operations illustrated in FIG. 5 are expected to provide low latency rendering of new viewports of multi-directional video in the presence of communication latencies between a source terminal 110 and a sink terminal 120. By transmitting low quality codings of tiles that do not belong to a current viewport, a sink terminal 120 may buffer the data locally. If/when a viewport changes to a spatial location that coincides with one of the formerly non-viewed viewports, the locally-buffered video may be decoded and displayed. The decoding and display can occur without incurring latencies involved with round-trip communication from the sink terminal 120 to the source terminal 110, which would be needed if data of the non-viewed viewport(s) were not prefetched to the sink device 120.

In an embodiment, a sink terminal 120 may identify a location of current viewport by identifying a spatial location within the multiview image at which the viewport is located, for example, by identifying its location within a coordinate space defined for the image (see, FIG. 2). In another aspect, a sink terminal 120 may identify tier(s) of a multi-directional image (FIG. 3) in which its current viewport is located and request chunk(s) from the tiers (FIG. 4) based on this identification.

FIG. 6 illustrates a method 600 of exemplary tile download according to an aspect of the present disclosure. FIG. 6 illustrates download operations that may occur for a tile that is not being viewed initially but to which the viewport moves during operation. Thus, a sink terminal 120 may issue requests for the tile at a tier 0 level of services, which are downloaded to the terminal 120 from a source terminal 110. FIG. 6 illustrates a request 610 for a chunk Y of the tile, from the tier 0 level of service. The terminal 110 may provide content of the chunk Y in a response message 630. The request and response messages 610, 630 for the chunk Y may be interleaved with other requests and responses exchanged by the source and sink terminals 110 (shown in phantom), 120 relating to chunks of other tiles, including both the tile in which the viewport is located and other tiles that are not being viewed.

In the example of FIG. 6, the viewport changes (box 620) from a prior tile to the tile that was requested in msg. 610. The viewport may change either while a request (msg. 610) for chunk Y is pending or after the content of chunk Y has been received (msg. 630). The example of FIG. 6 illustrates the viewport change (box 620) as occurring while msg. 610 is pending. In response to the viewport change, the terminal 120 may determine, from a history of prior requests, that a chunk Y at a tier 0 service level either has been requested or already has been received and is stored locally at the terminal 120. The terminal 120 may estimate whether there is time to request additional data of chunk Y (a differential tier) before the chunk Y must be rendered. If so, the terminal 120 may issue a request for chunk Y of the new tile using a differential tier (msg. 640).

If the source terminal 110 provides the media content of the differential tier (msg. 650) before the chunk Y must be rendered, the sink terminal 120 may render chunk Y (box 660) using content developed from the content provided in messages 630 and 650. If not, the sink terminal 120 may render chunk Y (box 660) using content developed from the tier 0 level of service (msg. 630).

FIG. 7 illustrates a rendering timeline of chunks that may occur according to the foregoing aspects of the present disclosure. FIG. 7 includes a data stream for a prior tile 710, for example for the tile of a viewport location prior to the change of the viewport location as in box 620 of FIG. 6, and FIG. 7 includes a data stream for a new tile 720, for example for the tile that includes the new viewport location after box 620 of FIG. 6. Data for prior tile 710 includes chunks Y−3 to Y+1, and data for new tile includes chucks Y−3 to Y+4. In this example, chunks Y−3 to Y−1 for the prior tile are shown having been retrieved at a relatively high level of service or quality (shown as tier 3) and, prior to a viewport switch, being rendered. When a viewport switch occurs from the prior tile 710 to the new tile 720 in the midst of chunk Y−1, a tier 0 level of service may be rendered for tile 720 at chunk Y−1. This may occur, for example, if a sink device 120 estimates that insufficient time exists to download a differential tier for new tile 720 at chunk Y−1, or if the sink device 120 requested a differential tier for the chunk but it was not received in time to be rendered.

The example of FIG. 7 illustrates rendering of tile 720 at chunks Y to Y+2 using data from both tier 0 and from differential tiers. This may occur, for example, if a sink device 120 had already requested the tier 0 levels of service for the chunks Y to Y+2 prior to the viewport switch and (for example, see request 610 in FIG. 6), after the switch, the sink device retrieved differential tiers for those chunks Y to Y+2 (for example, see response 650 in FIG. 6).

The example of FIG. 7 illustrates rendering of tile 720 from tier 3 starting from chunk Y+3. A switch from differential tiers to higher quality tiers (e.g., tier 3) may occur for chunks for which download requests are made after the viewport switch occurs. Thus, when a viewport changes from one tile to another, a sink terminal 120 may determine what tiers to request for the new tile from its operating state and the transmission latency in the system. In some cases there will be a transitional period after the viewport moves and before the sink terminal can render the new viewport location at a high quality of service (such as tier 3 for chunk Y+3 and later in FIG. 7). The transitional period may include rendering the new viewport location from a lower quality of service (such as tier 0 for chunk Y−1 in FIG. 7). The transitional period may also include rendering the new viewport location from an enhanced lower quality of services (such as tier 0 enhanced by the differential tier for chunks Y to Y+2 in FIG. 7).

Figure 8:
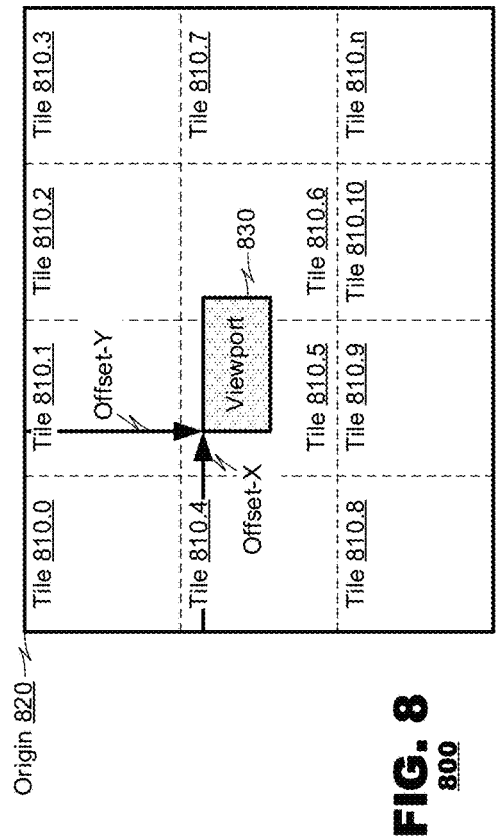
FIG. 8 illustrates a frame of omnidirectional video that may be coded by a source terminal.

FIG. 8 illustrates a frame 800 of omnidirectional video that may be coded by a source terminal 110. There, the frame 800 is illustrated as having been parsed into a plurality of tiles 810.0-810.n. Each tile may be coded in raster scan order. Thus, content of tile 810.0 may be coded separately from content of tile 810.1, content of tile 810.1 may be coded separately from content of tile 810.2. Furthermore, tiles 810.1-810.n may be coded in multiple tiers, producing discrete encoded data that may be segmented by both tier and tile. In one aspect, encoded data may also be segmented into time chunks. Hence, encoded data may be segmented into discrete segments for each time chunk, tile, and tier.

As discussed, a sink terminal 120 (FIG. 1) may extract a viewport 830 from the frame 800, after it is coded by the source terminal 110 (FIG. 1), transmitted to the sink terminal 120, and decoded. The sink terminal 120 may display the viewport 800 locally. The sink terminal 120 may transmit to the source terminal 110 viewport information, such as data identifying a location of the viewport 830 within an area of the frame 800. For example, the sink terminal 120 may transmit offset data, shown as offset-x and offset-y from origin 820, identifying a location of the viewport 830 within the area of the frame 800. In an aspect, a size and/or shape of the viewport 830 may be included in the viewport information sent to source terminal 110. Source terminal 120 may then use the received viewport information to select which discrete portions of encoded data to transmit to sink terminal 120. In the example of FIG. 8, viewport 830 spans tiles 810.5 and 810.6. Hence, a first tier may be sent for tiles 810.5 and 810.6, while a second tier may be sent for the remaining tiles that do not include any portion of the viewport. For example, when the first tier provides higher quality video and the second tier provides more efficient coding (high compression), the first tier may be sent to sink terminal 120 for tiles 810.5 and 810.6, while the second tier providing lower quality video may be sent for some or all of the other tiles.

In an aspect, a lower quality tier may be provided for all tiles. In another aspect a lower quality tier may be provided for only a portion of the frame 800. For example, a lower quality tier may be provided only for 180 degrees of view centered on the current viewport (instead of 360 degrees), or the lower quality tier may be provided only in areas of frame 800 where the viewport is likely to move next.

In an aspect, frame 800 may be encoded according to a layered coding protocol, where one tier is coded as a base layer, and other tiers are encoded as enhancement layers of the base layer. An enhancement layer may be predicted from one or more lower layers. For example, a first enhancement layer may be predicted from the base layer, and a second, higher enhancement layer may be predicted from either the base layer or from the first, lower enhancement layer.

An enhancement layer may be differentially or predictively coded from one or more lower layers. Non-enhancement layers, such as a base layer, may be encoded independently of other layers. Reconstruction at a decoder of a differentially coded layer will require both the encoded data segment of the differentially coded layer and the segment(s) from the differentially coded layer(s) from which it is predicted. In the case of a predictively coded layer, sending that layer may include sending both the discrete encoded data segment of the predictively coded layer, and also sending the discrete encoded data segment of the layer(s) used as a prediction reference. In an example, differential layered coding of frame 800, a lower base layer may be sent to sink terminal 120, for all tiles, while discrete data segments for a higher differential layer (that is coded using predictions from the base layer) may be sent only for tiles 810.5 and 810.6 as the viewport 830 is included in those tiles.

Figure 9:
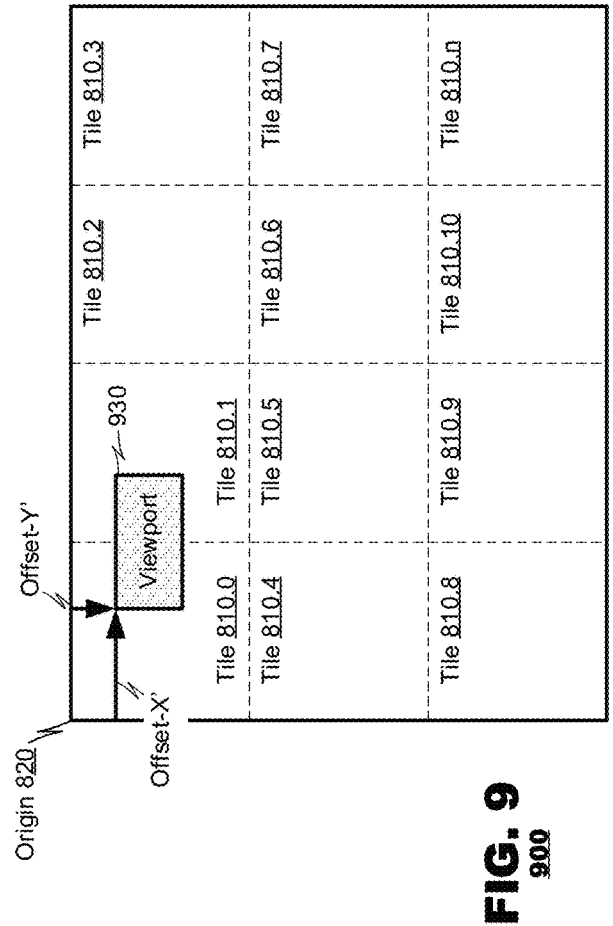
FIG. 9 illustrates a frame of omnidirectional video that may be coded by a source terminal.

FIG. 9 illustrates a frame 900 of omnidirectional video that may be coded by a source terminal 110. There, as in frame 800 of FIG. 8, the frame 900 is illustrated as having been parsed into a plurality of tiles 810.0-810.$n$. Frame 900 may represent a different video time from frame 800, for example a frame 900 may be a later time in the timeline of the video. At this later time, the viewport of sink terminal 120 may have moved to the location of viewport 930, which may be identified by offset-x' and offset-y' from origin 820. When the viewport of sink terminal 120 moves from the location of viewport 830 in FIG. 8 to the location of viewport 930 in FIG. 9, the sink terminal sends the new viewport information to source terminal 110. In response, sink terminal 120 may change which discrete segments of encoded video are sent to sink terminal, such that a first layer may be sent for tiles that include a portion of the viewport, while a second layer may be sent for tiles that do not include a portion of the viewport. In the example of FIG. 9, pixels of tiles 810.0 and 810.1 are included in viewport 930 and hence a first layer may be sent for these tiles, while a second layer may be sent for the tiles that do not include a portion of the viewport.

FIG. 10 is a simplified block diagram of an example video distribution system 100 suitable for use with the present invention, including when multi-directional video is pre-encoded and stored on a server. The system 1000 may include a distribution server system 1010 and a client device 1020 connected via a communication network 1030. The distribution system 1000 may provide coded multi-directional video data to the client 1020 in response to client requests. The client 1020 may decode the coded video data and render it on a display.

The distribution server 1010 may include a storage system 1040 on which pre-encoded multi-directional videos are stored in a variety of tiers for download by the client device 1020. The distribution server 1010 may store several coded representations of a video content item, shown as tiers 1, 2, and 3, which have been coded with different coding parameters. The video content item includes a manifest file containing pointers to chunks of encoded video data for each tier.

In the example of FIG. 10, the Tiers 1 and 2 differ by average bit rate, with Tier 2 enabling a higher quality reconstruction of the video content item at a higher average bitrate compared to that provided by Tier 1. The difference in bitrate and quality may be induced by differences in coding parameters—e.g., coding complexity, frame rates, frame size and the like. Tier 3 may be an enhancement layer of Tier 1, which, when decoded in combination with Tier 1, may improve the quality of the Tier 1 representation if it were decoded by itself. Each video tier 1-3 may be parsed into a plurality of chunks CH1.1-CH1.N, CH2.1-CH2.N, and CH3.1-CH3.N. Manifest file 1050 may include pointers to each chunk of encoded video data for each tier. The different chunks may be retrieved from storage and delivered to the client 1020 over a channel defined in the network 1030. Channel stream 1040 represents aggregation of transmitted chunks from multiple tiers. Furthermore, as explained above with regard to FIGS. 4 and 5, a multi-directional video may be spatially segmented into tiles. FIG. 10 depicts the chunks available for the various tiers of one tile. Manifest 1050 may additionally include other tiles (not depicted in FIG. 10), such as by providing metadata and pointers to multiple tiers including storage locations encoded data chunks for each of the various tiers.

The example of FIG. 10 illustrates three encoded video tiers 1, 2, and 3 for one tile, each tier coded into N chunks (1 to N) with different coding parameters. Although not required, this example illustrates the chunks of each tier as temporally-aligned so that chunk boundaries define respective time periods $(t_1, t_2, t_3, \ldots, t_N)$ of video content. Chunk boundaries may provide preferred points for stream switching between the tiers. Stream switching may be facilitated, for example, by resetting motion prediction coding state at switching points.

Times A, B, C, and D are depicted in FIG. 10 in part to assist in illustrating a moving viewport in an aspect of this disclosure. Times A, B, C, and D are positioned along the streaming timeline of the media chunks referenced by manifest 1050. Specifically, Times A, B, and D may correspond to the beginning of time period $t_1$, $t_2$, and $t_3$, respectively, while time C may correspond to a time somewhere in the middle of time period $t_2$, between the beginning of $t_2$ and the beginning of $t_3$.

In an aspect, multi-directional image data may include depth maps and/or occlusion information. Depth maps and/or occlusion information may be included as separate channel(s) and manifest 1050 may include references to these separate channel(s) for depth maps and/or occlusion information.

FIG. 11 illustrates a frame 1100 of multi-directional video with a moving viewport. There, frame 1100 is illustrated as having been parsed into a plurality of tiles 1110.0-1110.$n$. Superimposed upon frame 1100 is viewport location 1130 which may correspond to a first location of a viewport in client 1020 at first time, and viewport location 1140, which may correspond to a second location of the same viewport at a second time.

In an aspect, in steady state when a viewport is not moving, client 1020 may extract a viewport image from the high reconstruction quality of tier 2. During a transitional period, client 1020 may extract a viewport image from the reconstructed combination of tier 1 and enhancement layer tier 3 when the viewport moves into a new spatial tile, and then return to a steady state by extracting a viewport image from tier 2 once tier 2 is again available at client 1020. An example of this is illustrated in tables 1 and 2 for a viewport of client 1020 that were to jump from viewport location 1130 to viewport location 1140 right at time C. Client 1020 requests for tiers of tiles is listed in Table 1, and tiers from which a viewport image is extracted is listed in Table 2.

TABLE 1

Requests for tiles

|  | Time A | Time B | Time C | Time D |
|---|---|---|---|---|
| Tier 1 Tiles Requested (1 MB/sec) | All tiles except 1110.0 | All tiles except 1110.0 | None | All tiles except 1110.5 |
| Tier 2 Tiles Requested (2 MB/sec) | 1110.0 | 1110.0 | None | 1110.5 |
| Tier 3 Tiles Requested (Enhancement of Tier 1) | None | None | 1110.5 | None |

TABLE 2

Viewport extraction

|  | Time A | Time B | Time C | Time D |
|---|---|---|---|---|
| Viewport location | Tile 1110.0 | Tile 1110.0 | Tile 1110.5 | Tile 1110.5 |
| Extracted for Viewport | Tier 2 | Tier 2 | Tier 1; then Tier 1 + Tier 3 | Tier 2 |

Under the initial steady state condition during time period $t_1$, the viewport is not moving and viewport location 1130 is fully contained in tile 1110.0. Tier 2, being the higher quality tier, may be requested by client 1020 from server 1010 for tile 1110.0 at time A, as indicated in Table 1. For tiles not included in the viewport at location 1130 (tiles 1110.1-1110.n), the lower quality and more highly compressed tier 1 is requested instead. Hence, tier 1 chunks are requested for time period $t_1$ at time A for all tiles other than tile 1110.0. The viewport is then extracted from the reconstruction of tier 2 by client 1020 starting at time A.

At time B, the viewport has not yet moved, so the same tiers are requested by client 1020 for the same tiles as at time A, but the requests are for the specific chunks corresponding to time period $t_2$. At time C, the viewport of client 1020 may jump from viewport location 1130 to location 1140. At the point to time C, somewhere between the beginning and end of $t_2$, lower quality tier 1 has already been requested for the new location of the viewport, tile 1110.5. So, a viewport can be extracted immediately from tier 1 at time C when the viewport moves. At time C, tier 3 can may be requested, and as soon as it is available, the combination of tier 1 and enhancement layer tier 3 can be used for extracting a viewport image at client 1020. At time D, client 1020 may go back to a steady state by requesting layer 2 for tiles containing the viewport location, and layer 0 for tiles not containing the viewport location.

FIG. 12 is a functional block diagram of a coding system 1200 according to an aspect of the present disclosure. The system 1200 may include an image source 1210, an image processing system 1220, a video coder 1230, a video decoder 1240, a reference picture store 1250 and a predictor 1260. The image source 1210 may generate image data as a multi-directional image, containing image data of a field of view that extends around a reference point in multiple directions. The image processing system 1220 may perform image processing operations to condition the image for coding. In one aspect, the image processing system 1220 may generate different versions of source data to facilitate encoding the source data into multiple layers of coded data. For example, image processing system 1220 may generate multiple different projections of source video aggregated from multiple cameras. In another example, image processing system 1220 may generate resolutions of source video for a high layer with a higher spatial resolution and a lower layer with a lower spatial resolution. The video coder 1230 may generate a multi-layered coded representation of its input image data, typically by exploiting spatial and/or temporal redundancies in the image data. The video coder 1230 may output a coded representation of the input data that consumes less bandwidth than the original source video when transmitted and/or stored. Video coder 1230 may output data in discrete time chunks corresponding to a temporal portion of source image data, and in some aspects, separate time chunks encoded data may be decoded independently of other time chunks. Video coder 1230 may also output data in discrete layers, and in some aspects, separate layers may be transmitted independently of other layers.

The video decoder 1240 may invert coding operations performed by the video encoder 1230 to obtain a reconstructed picture from the coded video data. Typically, the coding processes applied by the video coder 1230 are lossy processes, which cause the reconstructed picture to possess various errors when compared to the original picture. The video decoder 1240 may reconstruct pictures of select coded pictures, which are designated as "reference pictures," and store the decoded reference pictures in the reference picture store 1250. In the absence of transmission errors, the decoded reference pictures may replicate decoded reference pictures obtained by a decoder (not shown in FIG. 12).

The predictor 1260 may select prediction references for new input pictures as they are coded. For each portion of the input picture being coded (called a "pixel block" for convenience), the predictor 1260 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture. In one aspect of layered coding, prediction references may be pixel blocks previously decoded from another layer, typically a lower layer lower than the layer currently being encoded. In the case of two layers that encode two different projections formats of multi-directional video, a function such as an image warp function may be applied to a reference image in one projection format at a first layer to predict a pixel block in a different projection format at a second layer.

In another aspect of a layered coding system, a differentially coded enhancement layer may be coded with restricted prediction references to enable seeking or layer/tier switching into the middle of an encoded enhancement layer chunk. In a first aspect, predictor 1260 may restrict prediction references of only every frame in an enhancement layer to be frames of a base layer or other lower layer. When every frame of an enhancement layer is predicted without reference to other frames of the enhancement layer, a decoder may switch to the enhancement layer at any frame efficiently because previous enhancement layer frames will never be necessary to reference as a prediction reference. In a second aspect, predictor 1260 may require that every Nth frame (such as every other frame) within a chuck be predicted only from a base layer or other lower layer to enable seeking to every Nth frame within an encoded data chunk.

When an appropriate prediction reference is identified, the predictor 1260 may furnish the prediction data to the video coder 1230. The video coder 1230 may code input video data differentially with respect to prediction data furnished by the predictor 1260. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further.

As indicated, the coded video data output by the video coder 1230 should consume less bandwidth than the input data when transmitted and/or stored. The coding system 1200 may output the coded video data to an output device 1270, such as a transceiver, that may transmit the coded video data across a communication network 130 (FIG. 1). Alternatively, the coding system 1200 may output coded data to a storage device (not shown) such as an electronic-, magnetic- and/or optical storage medium.

The transceiver 1270 also may receive viewport information from a decoding terminal (FIG. 7) and provide the viewport information to controller 1280. Controller 1280 may control the image processor 1220, the video coding process overall, including video coder 1230 and transceiver 1270. Viewport information received by transceiver 1270 may include a viewport location and/or a preferred projection format. In one aspect, controller 1280 may control transceiver 1270 based on viewport information to send certain coded layer(s) for certain spatial tiles, while sending a different coded layer(s) for other tiles. In another aspect, controller 1280 may control the allowable prediction references in certain frames of certain layers. In yet another aspect, controller 1280 may control the projection format(s) or scaled layers produced by image processor 1230 based on the received viewport information.

FIG. 13 is a functional block diagram of a decoding system 1300 according to an aspect of the present disclosure. The decoding system 1300 may include a transceiver 1310, a buffer 1315, a video decoder 1320, an image processor 1330, a video sink 1340, a reference picture store 1350, a predictor 1360, and a controller 1370. The transceiver 1310 may receive coded video data from a channel and route it to buffer 1315 before sending it to video decoder 1320. The coded video data may be organized into chunks of time and spatial tiles, and may include different coded layers for different tiles. The video data buffered in buffer 1315 may span the video time of multiple chunks. The video decoder 1320 may decode the coded video data with reference to prediction data supplied by the predictor 1360. The video decoder 1320 may output decoded video data in a representation determined by a source image processor (such as image processor 1220 of FIG. 12) of a coding system that generated the coded video. The image processor 1330 may extract video data from the decoded video according to the viewport orientation currently in force at the decoding system. The image processor 1330 may output the extracted viewport data to the video sink device 1340. Controller 1370 may control the image processor 1330, the video decoding processing including video decoder 1320, and transceiver 1310.

The video sink 1340, as indicated, may consume decoded video generated by the decoding system 1300. Video sinks 1340 may be embodied by, for example, display devices that render decoded video. In other applications, video sinks 1340 may be embodied by computer applications, for example, gaming applications, virtual reality applications and/or video editing applications, that integrate the decoded video into their content. In some applications, a video sink may process the entire multi-directional field of view of the decoded video for its application but, in other applications, a video sink 1340 may process a selected sub-set of content from the decoded video. For example, when rendering decoded video on a flat panel display, it may be sufficient to display only a selected subset of the multi-directional video. In another application, decoded video may be rendered in a multi-directional format, for example, in a planetarium.

The transceiver 1310 also may send viewport information provided by the controller 1370, such as a viewport location and/or a preferred projection format, to the source of encoded video, such as terminal 1200 of FIG. 12. When the viewport location changes, controller 1370 may provide new viewport information to transceiver 1310 to send on to the encoded video source. In response to the new viewport information, missing layers for certain previously received but not yet decoded tiles of encoded video may be received by transceiver 1310 and stored in buffer 1315. Decoder 1320 may then decode these tiles using these replacement layers (which were previously missing) instead of the layers that had previously been received based on the old viewport location.

Controller 1370 may determine viewport information based on a viewport location. In one example, the viewport information may include just a viewport location, and the encoded video source may then use the location to identify which encoded layers to provide to decoding system 1300 for specific spatial tiles. In another example, viewport information sent from the decoding system may include specific requests for specific layers of specific tiles, leaving much of the viewport location mapping in the decoding system. In yet another example, viewport information may include a request for a particular projection format based on the viewport location.

The principles of the present disclosure find application with a variety of projection formats of multi-directional images. In an aspect, one may convert between the various projection formats of FIGS. 14-16 using a suitable projection conversion function.

Figure 14:
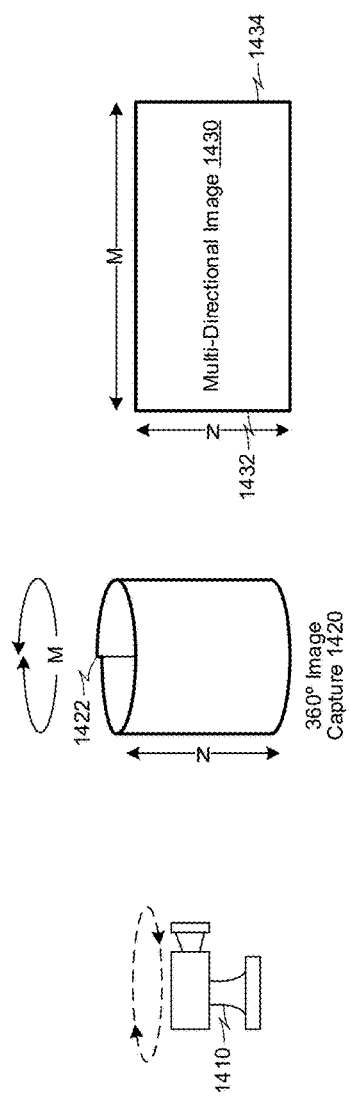
FIG. 14 illustrates an exemplary multi-directional image projection format according to one aspect.

FIG. 14 illustrates an exemplary multi-directional image projection format according to one aspect. The multi-directional image 1430 may be generated by a camera 1410 that pivots along an axis. During operation, the camera 1410 may capture image content as it pivots along a predetermined angular distance 1420 (preferably, a full 360°) and may merge the captured image content into a 360° image. The capture operation may yield a multi-directional image 1430 that represents a multi-directional field of view having been partitioned along a slice 1422 that divides a cylindrical field of view into a two dimensional array of data. In the multi-directional image 1430, pixels on either edge 1432, 1434 of the image 1430 represent adjacent image content even though they appear on different edges of the multi-directional image 1430.

Figure 15:
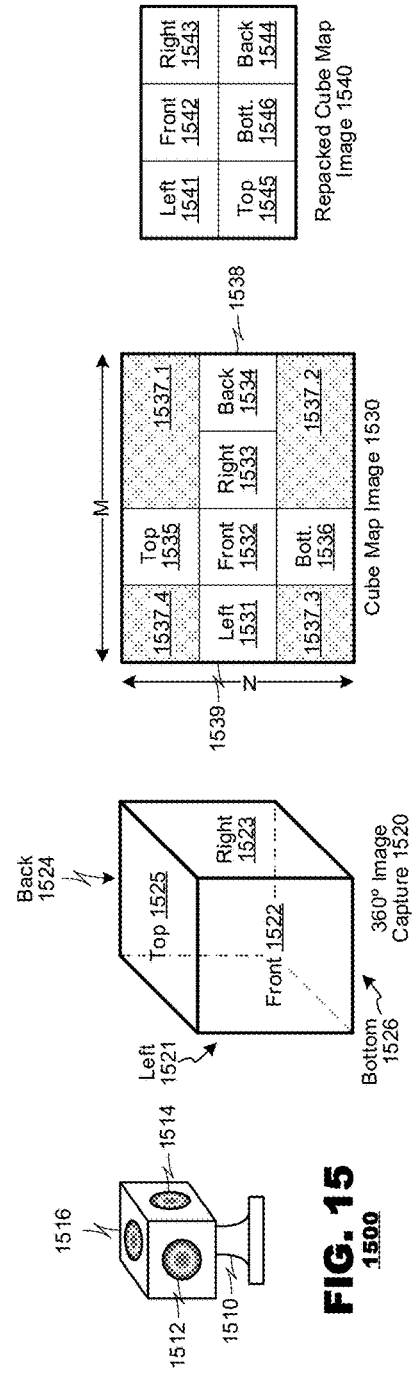
FIG. 15 illustrates an exemplary multi-directional image projection format according to another aspect.

FIG. 15 illustrates an exemplary multi-directional image projection format according to another aspect. In the aspect of FIG. 15, a camera 1510 may possess image sensors 1512-1516 that capture image data in different fields of view from a common reference point. The camera 1510 may output a multi-directional image 1530 in which image content is arranged according to a cube map capture operation 1520 in which the sensors 1512-1516 capture image data in different fields of view 1521-1526 (typically, six) about the camera 1510. The image data of the different fields of view 1521-1526 may be stitched together according to a cube map layout 1530. In the example illustrated in FIG. 15, six sub-images corresponding to a left view 1521, a front view 1522, a right view 1523, a back view 1524, a top view 1525 and a bottom view 1526 may be captured, stitched and arranged within the multi-directional picture 1530 according to "seams" of image content between the respective views 1521-1526. Thus, as illustrated in FIG. 15, pixels from the front image 1532 that are adjacent to the pixels from each of the left, the right, the top, and the bottom images 1531, 1533, 1535, 1536 represent image content that is adjacent respectively to content of the adjoining sub-images. Similarly, pixels from the right and back images 1533, 1534 that are adjacent to each other represent adjacent image content. Further, content from a terminal edge 1538 of the back image 1534 is adjacent to content from an opposing terminal edge 1539 of the left image. The image 1530 also may have regions 1537.1-1537.4 that do not belong to any image. The representation illustrated in FIG. 15 often is called a "cube map" image.

Coding of cube map images may occur in several ways. In one coding application, the cube map image 1530 may be coded directly, which includes coding of null regions 1537.1-1537.4 that do not have image content. The encoding techniques of FIG. 3 may be applied to cube map image 1530.

In other coding applications, the cube map image 1530 may be repacked to eliminate null regions 1537.1-1537.4 prior to coding, shown as image 1540. The techniques described in FIG. 3 may also be applied to a packed image frame 1540. After decode, the decoded image data may be unpacked prior to display.

Figure 16:
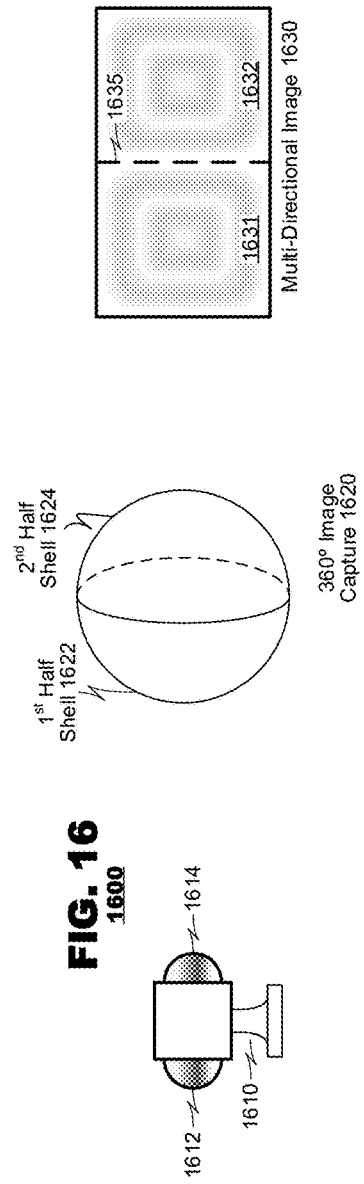
FIG. 16 illustrates another exemplary multi-directional projection image format 1630.

FIG. 16 illustrates another exemplary multi-directional projection image format 1630. The frame format of FIG. 16 may be generated by another type of omnidirectional camera 1600, called a panoramic camera. A panoramic camera typically is composed of a pair of fish eye lenses 1612, 1614 and associated imaging devices (not shown), each arranged to capture image data in a hemispherical view of view. Images captured from the hemispherical fields of view may be stitched together to represent image data in a full 360° field of view. For example, FIG. 16 illustrates a multi-directional image 1630 that contains image content 1631, 1632 from the hemispherical views 1622, 1624 of the camera and which are joined at a seam 1635. The techniques described hereinabove also find application with multi-directional image data in such formats 1630.

In an aspect, cameras, such as the cameras 1410, 1510, and 1610 in FIGS. 14-16, may capture depth or occlusion information in addition to visible light. In some cases, depth and occlusion information may be stored as separate data channels of data in multi-projection formats such as images such as 1430, 1530, 1540, and 1630. In other cases, depth and occlusion information may be included as a separate data channel in a manifest, such as manifest 1050 of FIG. 10.

Figure 17:
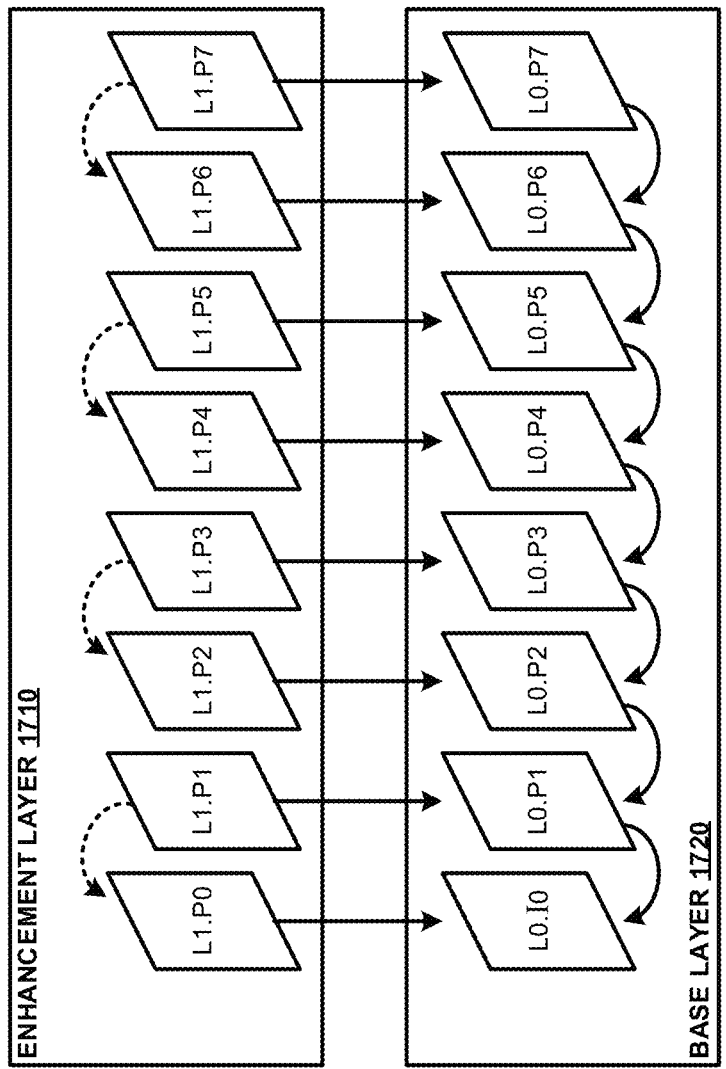
FIG. 17 illustrates an exemplary prediction reference pattern.

FIG. 17 illustrates an exemplary prediction reference pattern. Video sequence 1700 includes a base layer 1720 and enhancement layer 1710, each layer comprising a series of corresponding frames. Base layer 1720 includes an intra-coded frame L0.I0 followed by predicted frames L0.P1-L0.P7. Enhancement layer 1710 includes predicted frames L1.P0-L1.P7. Intra-coded frame L0.I0 may be coded without prediction from any other frame. Predicted frames may be coded by predicting pixel blocks of the frame portions of reference frames indicated by solid arrows in FIG. 17, where the arrow head points to a reference frame that may be used as a prediction reference for a frame touching the tail of the arrow. For example, predicted frames in a base layer may be predicted using only a previous base layer frame as a prediction reference. As depicted in FIG. 17, L0.P1 is predicted only from frame L0.I0 as a reference, L0.P1 may be a reference for L0.P2, L0.P2 may be reference for L0.P3, and so on, as indicated by the arrows inside base layer 1720. The frames of enhancement layer 1710 may be predicted using only corresponding base layer reference frames, such that L0.I0 may be a prediction reference for L1.P0, L0.P1 may be a prediction reference for L1.P1, and so on.

In an aspect, enhancement layer 1710 frames may also be predicted from previous enhancement layer frames, as indicated by optional dashed arrows in FIG. 17. For example, frame L1.P7 may be predicted from either L0.P7 or L1.P6. Prediction references within enhancement layer 1710 may be limited such that only a subset of enhancement layer frames may use other enhancement layer frames as a prediction reference, and this subset of enhancement layer frames may follow a pattern. In the example of FIG. 17, every other frame of enhancement layer 1710 (L1.P0, L1.P2, L1.P4, and L1.P6) is predicted only from the corresponding base layer frame, while alternate frames (L1.P1, L1.P3, L1.P5, L1.P7) may be predicted from either base layer frames or previous enhancement layer frames. Tier switching to enhancement layer 1710 may be facilitated at the frames that are predicted only from lower layers because prior frames of the enhancement layer need not be previously decoded for use a reference frames. Enhancement layer frames that are predicted only from lower layer frames may be considered safe-switching frames, sometimes called key frames, because previous frames from the enhancement layer need not be available to correctly decode these safe switching frames.

In an aspect, a sink terminal may switch to a new layer or new tier on non-safe-switching frames when some decoded quality drift may be tolerated. A non-safe switching frame may be decoded without having access to the reference frames used for its prediction, and quality gradually gets worse as errors from incorrect predictions accumulate into what may be called quality drift. Error concealment techniques may be used to mitigate the quality drift due to switching at non-safe-switching enhancement layer frames. Example error concealment techniques include predicting from a frame similar to the missing reference frame, and periodic intra-refresh mechanisms. By tolerating some quality drift caused by switching at non-safe-switching frames, the latency can be reduced between moving a viewport and presenting images of the new viewport location.

FIG. 18 illustrates two exemplary multi-directional projections for combining. Images of the same scene may be encoded in a plurality of projection formats. In the example of FIG. 18, a multi-directional scene is encoded as a first image with a first projection format, such as an image 1810 in equirectangular projection format, and the same scene is encoded as a second image in a second projection format, such as image 1820 in a cube map projection format. Region of interest 1812 projected onto equirectangular image 1810 and region of interest 1822 projected onto cube map image 1820 may both correspond to the same region of interest in the scene projected into images 1810 and 1820. Cube Map image 1820 may include null regions 1837.1-1837.4 and cube faces left, front, right, back, top and bottom 1831-1836.

In one aspect, multiple projection formats may be combined to form a better reconstruction of a region of interest (ROI) than can be produced from a single projection format. A reconstructed region of interest, $ROI_{combo}$, may be produced from a weighted sum of the encoded projections or may be produced from a filtered sum of the encoded projections. For example, the region of interest in the scene of FIG. 18 may be reconstructed as:

$$ROI_{combo} = f(ROI_1, ROI_2)$$

where f( ) is a function for combining two region of interest images, first region of interest image $ROI_1$ may be, for example, the equirectangular region of interest image from ROI 1812, and second region of interest image $ROI_2$ may be, for example, the cube map region of interest image from ROI 1822. If f( ) is a weighted sum, $$ROI_{combo} = alpha*ROI_1 + beta/ROI_2$$

where alpha and beta are predetermined constants, and alpha+beta=1. In cases where pixel locations do not exactly correspond in the projection formats being combined, a projection format conversion function may be used, as in:

$$ROI_{combo} = alpha*PConv(ROI_1) + beta*ROI_2$$

where PConv( ) is a function that converts an image in a first projection format into a second projection format. For example, PConv( ) may simply be an up-sample or a down-sample function.

In another aspect, the best projection formation for encoding an entire multi-directional scene, such as for encoding a base layer, may be different than the best projection format for encoding only a region of interest, such as for encoding in an enhancement layer. Hence a multi-tiered encoding of the scene of FIG. 18 may include encoding the entirety of equirectangular image 1810 in a first tier, and encoding only the ROI 1822 of cube map image 1820 in a second tier. For example ROI 1822 may be encoded by encoding the entire front face 1832 as a tile of cube map image 1820. In a further aspect, this second tier may be encoded as an enhancement layer over the first tier base layer, as depicted in FIG. 19.

FIG. 19 illustrates an exemplary system for creating a residual from two different multi-directional projections. A base layer ROI image 1910 in a projection format P1 may be converted to a projection format P2 by conversion process 1902 to create a prediction of the ROI image 1920 in projection format P2. The prediction image from conversion process 1902 is subtracted from the actual P2 ROI image 1920 at adder 1904 to produce a P2 residual ROI, which may then be encoded as a P2 projection enhancement layer over a P1 base layer. In an aspect, the base layer may encode the entire scene in projection P1, while the enhancement layer may encode only a region of interest within the scene in projection P2. This aspect may be beneficial, for example, when projection P1 is preferred for encoding the entire scene, while projection P2 is preferred for encoding a particular region of interest. For example, with respect to FIG. 18, a first tier may be encoded as a base layer comprising the entire equirectangular image 1810, while a second tier may be encoded as an enhancement layer comprising a subset of cube map image 1820 such as a single tile or region of interest.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs include processor instructions and typically are stored in physical storage media such as electronic-, magnetic-, and/or optically-based storage devices, where they are read by a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

We claim:

1. A video reception method, comprising:
   receiving, from a source, first streams of coded data for each of a plurality of tiles representing a multi-directional video, including a steady-state stream representing a first tile encoded at a first tier of quality, and transitional streams respectively representing other tiles of the plurality of tiles including a first transitional stream coded as a base layer of a second tier of quality, wherein each tile corresponds to a predetermined spatial region of the multi-directional video, a current viewport location at a receiver includes at least the first tile, the steady state stream is a non-enhancement layer coded independently of other layers, and the first tier of quality is higher quality than the second tier of quality;
   decoding the first tier of the first tile from the first, steady-state stream;
   displaying the decoded first tier for the current viewport location;
   when the viewport location at the receiver changes to include a second tile of the other tiles:
     decoding the base layer of the first transitional stream corresponding to the second tile, and
     transmitting an indication of the second tile to the source;
   receiving, from the source and in response to the transmitting, a second transitional stream of coded video data for the second tile coded as an enhancement layer for the base layer of the first transitional stream corresponding to the second tile, wherein the enhancement layer, when decoded and combined with the base layer, correspond to a third tier of quality higher than the second tier;
   decoding the enhancement layer of the second tile from the second transitional stream corresponding to the second tile using the base layer of the second tile from the first transitional stream; and
   displaying, when the viewport location at the receiver changes to include the second tile, as much of the decoded first and second transitional streams for the second tile as are decoded, and
   thereafter, retrieving, decoding and displaying a steady-state stream for the second tile encoded at the first tier of quality.

2. The video reception method of claim 1, wherein the base layer for the second tile is received and stored in a local buffer before the viewport location changes to include the second tile.

3. The video reception method of claim 1, wherein:
   the coded data of the first streams and the second streams include data coded at a first tier of lower quality and a second tier of higher quality, the first streams include the second tier for tile(s) of the current viewport location, the new first stream retrieved from local storage includes the first tier for tiles of the changed viewport location, and the second streams include the second tier for tile(s) of the changed viewport location.

4. The video reception method of claim 1, wherein the coded data of the first streams includes data coded in a first projection format and data coded in the second streams includes data coded in a second projection format, and further comprising:
selecting the second projection format based on the changed viewport location.

5. The video reception method of claim 1, wherein:
the coded data of the first streams and the second streams are coded according to a layered coding protocol, the first streams including an enhancement layer for tile(s) of the current viewport location, the first streams retrieved from local storage including a base layer, and the second streams including an enhancement layer for tile(s) of the changed viewport location.

6. The video reception method of claim 5, wherein:
a first subset of frames of the second stream enhancement layer is predicted only from reconstructed base layer frames; and
a second subset of frames of the second stream enhancement layer is predicted from reconstructed frames of both base and enhancement layers; and
decoding of second stream starts at a frame time corresponding to a frame in the first subset of frames.

7. The video reception method of claim 5, wherein decoding the second streams starts on a frame with prediction references that are not available, and further comprising:
mitigating the quality drift caused by missing prediction references with error concealment techniques.

8. The video reception method of claim 5, wherein:
the base layer is encoded in a first projection format, the enhancement layer is in a second projection format, and further comprising:
predicting enhancement layer data from reconstructed based layer data by applying a function that converts from the first projection format to the second projection format.

9. A video reception system, comprising:
a receiver for receiving coded video streams from a source;
a decoder for decoding coded video streams;
a controller to cause:
receiving, by the receiver and from the source, first streams of coded data for each of a plurality of tiles representing a multi-directional video including a steady-state stream representing a first tile encoded at a first tier of quality, and transitional streams respectively representing other tiles of the plurality of tiles including a first transitional stream coded as a base layer of a second tier of quality, wherein each tile corresponds to a predetermined spatial region of the multi-directional video, a current viewport location at a receiver includes at least the first tile, the steady state stream is a non-enhancement layer coded independently of other layers, and the first tier of quality is higher quality than the second tier of quality;
decoding, by the decoder, the first tier of the first tile from the first, steady-state stream streams;
displaying the decoded first tier for the current viewport location;
when the viewport location at the receiver changes to include a second tile of the other of tiles:
decoding, by the decoder, the base layer of the first transitional stream corresponding to the second tile, and
transmitting an indication of the second tile to the source;
receiving, from the source and in response to the transmitting, a second transitional stream of coded video data for the second tile coded as an enhancement layer for the base layer of the first transitional stream corresponding to the second tile, wherein the enhancement layer, when decoded and combined with the base layer, correspond to a third tier of quality higher than the second tier;
decoding the enhancement layer of the second tile from the second transitional stream corresponding to the second tile using the base layer of the second tile from the first transitional stream; and
displaying, when the viewport location at the receiver changes to include the second tile, as much of the decoded first and second transitional streams for the second tile as are decoded, and
thereafter, retrieving, decoding and displaying a steady-state stream for the second tile encoded at the first tier of quality.

10. The video reception system of claim 9, further comprising:
a local buffer for buffering coded video data received by the receiver;
wherein the base layer for the second tile is received and stored in the local buffer before the viewport location changes to include the second tile.

11. The video reception system of claim 9, wherein:
the coded data of the first streams and the second streams include data coded at a first tier of lower quality and a second tier of higher quality, the first stream includes the second tier for tile(s) of the current viewport location, the new first stream retrieved from local storage includes the first tier for tiles of the changed viewport location, and the second stream includes the second tier for tile(s) of the changed viewport location.

12. The video reception system of claim 9, wherein the coded data of the first streams includes data coded in a first projection format and data coded in the second streams includes data coded in a second projection format, and further comprising:
selecting the second projection format based on the changed viewport location.

13. The video reception system of claim 9, wherein:
the coded data of the first streams and the second streams are coded according to a layered coding protocol, the first streams including an enhancement layer for tile(s) of the current viewport location, the first streams retrieved from local storage including a base layer, and the second streams including an enhancement layer for tile(s) of the changed viewport location.

14. A non-transitory computer readable medium comprising instructions that, when executed by a processor, cause:
receiving, from a source, first streams of coded data for each of a plurality of tiles representing a multi-directional video including a steady-state stream representing a first tile encoded at a first tier of quality, and transitional streams respectively representing other tiles of the plurality of tiles including a first transitional stream coded as a base layer of a second tier of quality, wherein each tile corresponds to a predetermined spatial region of the multi-directional video, a current viewport location at a receiver includes at least the first tile, the steady state stream is a non-enhancement layer coded independently of other layers, and the first tier of quality is higher quality than the second tier of quality;

decoding the first tier of the first tile from the first, steady-state stream;

displaying the decoded first tier for the current viewport location;

when the viewport location at the receiver changes to include a second tile of the other tiles:
  decoding the base layer of the first transitional stream corresponding to the second tile, and
  transmitting an indication of the second tile to the source;

receiving, from the source and in response to the transmitting, a second transitional stream of coded video data for the second tile coded as an enhancement layer for the base layer of the first transitional stream corresponding to the second tile, wherein the enhancement layer, when decoded and combined with the base layer, correspond to a third tier of quality higher than the second tier;

decoding the enhancement layer of the second tile from the second transitional stream corresponding to the second tile using the base layer of the second tile from the first transitional stream; and displaying, when the viewport location at the receiver changes to include the second tile, as much of the decoded first and second transitional streams for the second tile as are decoded, and thereafter, retrieving, decoding and displaying a steady-state stream for the second tile encoded at the first tier of quality.

15. The computer readable medium of claim 14, the base layer for the second tile is received and stored in a local buffer before the viewport location changes to include the second tile.

16. The computer readable medium of claim 14, wherein:
the coded data of the first streams and the second streams include data coded at a first tier of lower quality and a second tier of higher quality, the first stream includes the second tier for tile(s) of the current viewport location, the new first stream retrieved from local storage includes the first tier for tiles of the changed viewport location, and the second stream includes the second tier for tile(s) of the changed viewport location.

17. The computer readable medium of claim 14, wherein the coded data of the first streams includes data coded in a first projection format and data coded in the second streams includes data coded in a second projection format, and the instructions further cause:
  selecting the second projection format based on the changed viewport location.

18. The computer readable medium of claim 14, wherein: the coded data of the first streams and the second streams are coded according to a layered coding protocol, the first streams including an enhancement layer for tile(s) of the current viewport location, the first streams retrieved from local storage including a base layer, and the second streams including an enhancement layer for tile(s) of the changed viewport location.

19. The method of claim 1, further comprising:
prior to the receiving of the second streams, displaying the decoded base layer of the second tier for the changed viewport location.

20. The method of claim 1, wherein the displaying, when the viewport location at the receiver changes to include a second tile, includes:
  displaying first transitional images of the second tile from the decoded base layer of the first transitional stream; and
  after displaying first transitional images and before the displaying the steady-state stream for the second tile, displaying second transitional images of the second tile from the decoded enhancement layer of the second transitional stream;
  wherein the received steady state stream is encoded at a highest video quality, the received transitional enhancement layer is encoded at a middle video quality, and the transitional base layer corresponds to a lowest video quality.

21. A method, comprising:
based on a current viewport location at a video display device, requesting video of a plurality of tiles and a first plurality of segments representing a multi-directional video, the tiles each corresponding to a respective spatial region of a multi-directional video space, and the segments corresponding to video content of the tiles during respective temporal durations of the video, the requesting including:
  requesting first video segment(s) of tile(s) that correspond spatially to the current viewport location at a first quality tier coded as a base layer not dependent on another layer, and
  requesting first video segments of other tiles outside the current viewport location at a second quality tier, lower than a quality of the first quality tier, coded as a base layer not dependent on another layer,
  when the current viewport location changes to a new viewport location, for each tile that corresponds spatially to the new viewport location, requesting transitional video segments corresponding temporally to the first segment(s) for which requests at the second quality tier previously were made, wherein the transitional video segments are coded as an enhancement layer of base layer coding of the second quality tier,
  decoding the second quality tier video segments and the transitional video segments that correspond to the new viewport location;
  displaying video obtained from the decoding as video of the new viewport location.

22. The method of claim 21, further comprising, for the new viewport location and for temporal portion(s) of the video after the first plurality of segments:
  requesting second video segment(s) of tile(s) that correspond spatially to the new viewport location at the first quality tier coded as a base layer not dependent on another layer, and
  decoding the first quality tier of the second video segments that correspond to the new viewport location.

* * * * *